(12) United States Patent
Yamazaki

(10) Patent No.: US 6,479,917 B2
(45) Date of Patent: Nov. 12, 2002

(54) MOTOR BRUSH STRUCTURE AND MOTOR-DRIVEN POWER STEERING DEVICE USING THE SAME MOTOR

(75) Inventor: Takeshi Yamazaki, Maebashi (JP)

(73) Assignee: Mitsuba Corporation, Gunma (JP)

( * ) Notice: Subject to any disclaimer, the term of this patent is extended or adjusted under 35 U.S.C. 154(b) by 8 days.

(21) Appl. No.: 09/895,033

(22) Filed: Jun. 29, 2001

(65) Prior Publication Data

US 2002/0005313 A1 Jan. 17, 2002

(30) Foreign Application Priority Data

Jul. 11, 2000 (JP) ........................................ 2000-210272

(51) Int. Cl.$^7$ .............................................. H02K 13/00
(52) U.S. Cl. ........................ 310/239; 310/51; 310/220; 310/219; 310/229
(58) Field of Search .................... 310/239, 51, 220, 310/222, 219, 225, 224, 230, 249, 229; 180/443; 318/432, 434

(56) References Cited

U.S. PATENT DOCUMENTS

| | | | | |
|---|---|---|---|---|
| 3,660,739 A | * | 5/1972 | Okuyama et al. ............ 318/227 |
| 3,875,495 A | * | 4/1975 | Middlebrook ................. 321/28 |
| 4,523,116 A | * | 6/1985 | Dibbern, Jr. et al. ......... 310/71 |
| 5,602,957 A | * | 2/1997 | Wille et al. .................. 338/836 |
| 5,949,173 A | * | 9/1999 | Wille et al. .................. 310/220 |
| 6,246,197 B1 | * | 6/2001 | Kurishige et al. ........... 318/432 |

* cited by examiner

Primary Examiner—Nestor Ramirez
Assistant Examiner—Thanh Lam
(74) Attorney, Agent, or Firm—McCormick, Paulding & Huber LLP

(57) ABSTRACT

To present a motor brush structure capable of decreasing the current ripple and torque ripple substantially while minimizing the cost increase, and, by using the same motor, a motor-driven power steering device capable of suppressing generation of working sound, magnetostriction sound, radio noise, and cogging feel during steering operation. In a motor-driven power steering device used as a steering device for turning wheels such as front wheels of an automobile, a pair of shunt brushes for shunting are added to a pair of main brushes, these shunt brushes are disposed at positions for geometrically inverting the brush contact positions with segments, and it is composed so that the waveforms of the current flowing in the main brushes 11 from each segment of a commutator to each coil, the current into the shunt brushes, and the shunted current may be mutually inverted in phase to cancel each other.

2 Claims, 7 Drawing Sheets

2 BRUSHES
(A-B ENERGIZED)

INVENTION

WITH SHUNT
BRUSHES (A-B, C-D
ENERGIZED)

MOTOR BRUSH STRUCTURE AND MOTOR-DRIVEN POWER STEERING DEVICE USING THE SAME MOTOR

TECHNICAL FIELD OF THE INVENTION

The present invention relates to a brush structure of a motor, and more particularly to a brush structure of a motor capable of reducing current ripple and torque ripple in a motor-driven power steering device for vehicles using a DC brush motor, and an effective technology when applied in a motor-driven power steering device using the same motor.

BACKGROUND OF THE INVENTION

As the technology studied by the present inventor, for example, a motor-driven power steering device has generally been used as a steering device of turning wheels such as front wheels of an automobile. Hitherto, the motor-driven power steering device is known as rack assist type, in which a DC brush motor is provided coaxially with a rack shaft, and a steering assisting force is obtained by the DC brush motor provided on this rack shaft.

The motor-driven power steering device of rack assist type comprises a DC brush motor, a rack shaft coaxially provided in the DC brush motor, turning wheels coupled with the rack shaft by rack and pinion through a coupling machanism, and a steering wheel, in which the steering assisting force generated by the DC brush motor is transmitted to the rack shaft through a ball screw mechanism. The turning wheels are steered by the steering assisting force due to the DC brush motor and by the manual steering force due to manipulation of the steering wheel, so that the driver's effort in steering is lessened.

SUMMARY OF THE INVENTION

Such motor-driven power steering device using the DC brush motor was investigated by the inventor, and the following facts were disclosed. In this motor-driven power steering device, the current ripple generated when the brush commutates among segments of the commutator, and the resulting torque fluctuations cause working sound, magnetostriction sound, radio noise, and cogging feel during steering operation, which is known to impair the commercial value significantly.

As the countermeasure, hitherto, the brush shape was modified, or the contact state of brushes and segments were stabilized by long-time aging, but such measures were main causes of increasing the cost.

It is hence an object of the invention, by paying attention to current ripple and torque ripple, to present a brush structure of a motor capable of reducing the current ripple and torque ripple substantially while minimizing the cost increase, and a motor-driven power steering device using the same motor capable of suppressing the generation of working sound, magnetostriction sound, radio noise, and cogging feel during steering operation.

A brush structure of a motor of the invention comprises an armature core having a plurality of slots; a plurality of coils wound around each one of the plurality of slots; a commutator having a plurality of segments connected to each one of the plurality of coils; a pair of first brushes electrically contacting with each segment of the commutator for feeding power to each coil from each segment; and a pair of second brushes disposed at a phase angle for inverting the brush contacting position to each segment corresponding to the first brushes, and electrically contacting with each segment of the commutator for feeding power to each coil from each segment. Therefore, each phase of current waveforms of the first brushes and second brushes is inverted to cancel each other.

A motor-driven power steering device of the invention uses this motor as a DC brush motor for generating a steering assisting force, and turning wheels are steered by the steering assisting force due to the DC brush motor and by a manual steering force due to manipulating a steering wheel. In particular, the invention is preferably applied in a motor-driven power steering device using a motor of high response.

BRIEF DESCRIPTIONS OF THE DRAWINGS

Figure 6A:
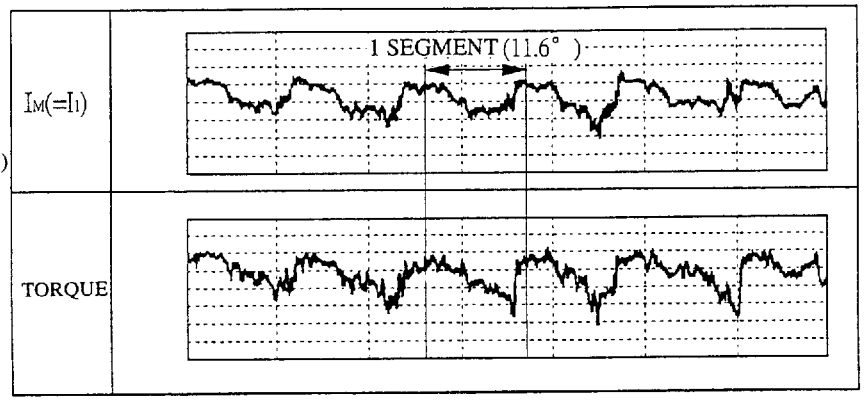
Figure 6B:
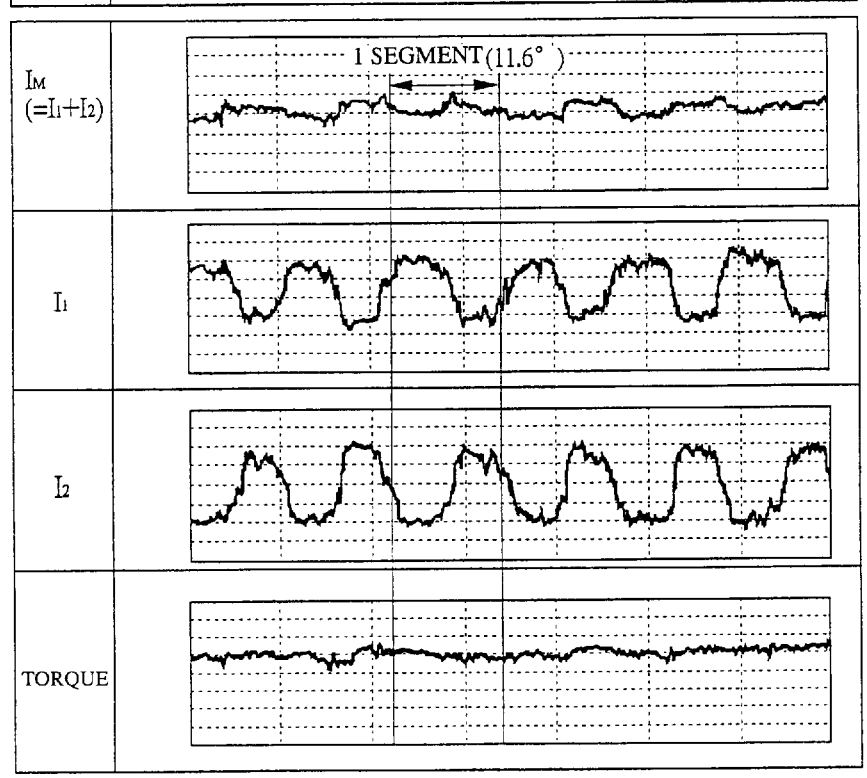
Figure 7:
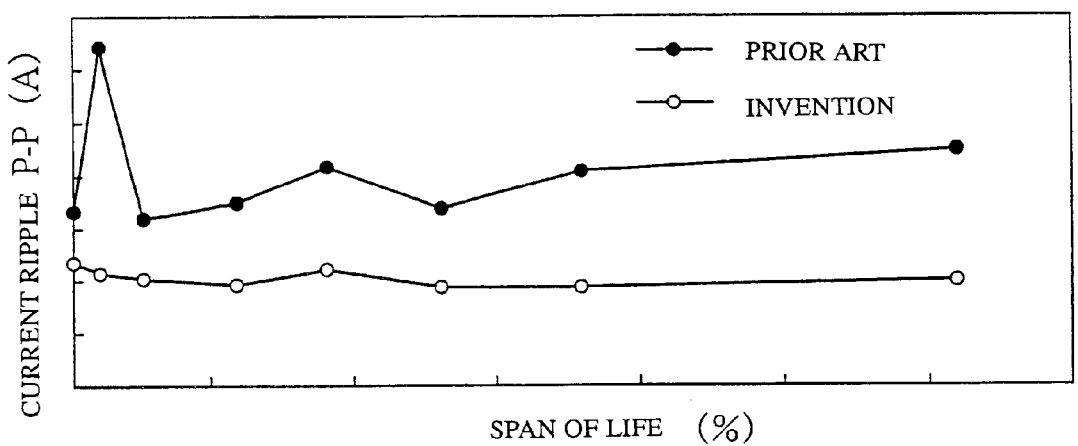

FIG. 6A is a waveform diagram showing current ripple and torque ripple in the motor-driven power steering device in the conventional DC brush motor and FIG. 6B is a waveform diagram showing current ripple and torque ripple in the motor-driven power steering device in the embodiment of the invention; and FIG. 7 is a characteristic diagram showing time-course changes of current ripple in the motor-driven power steering device in the embodiment of the invention.

DESCRIPTION OF THE PREFERRED EMBODIMENTS

Figure 1:
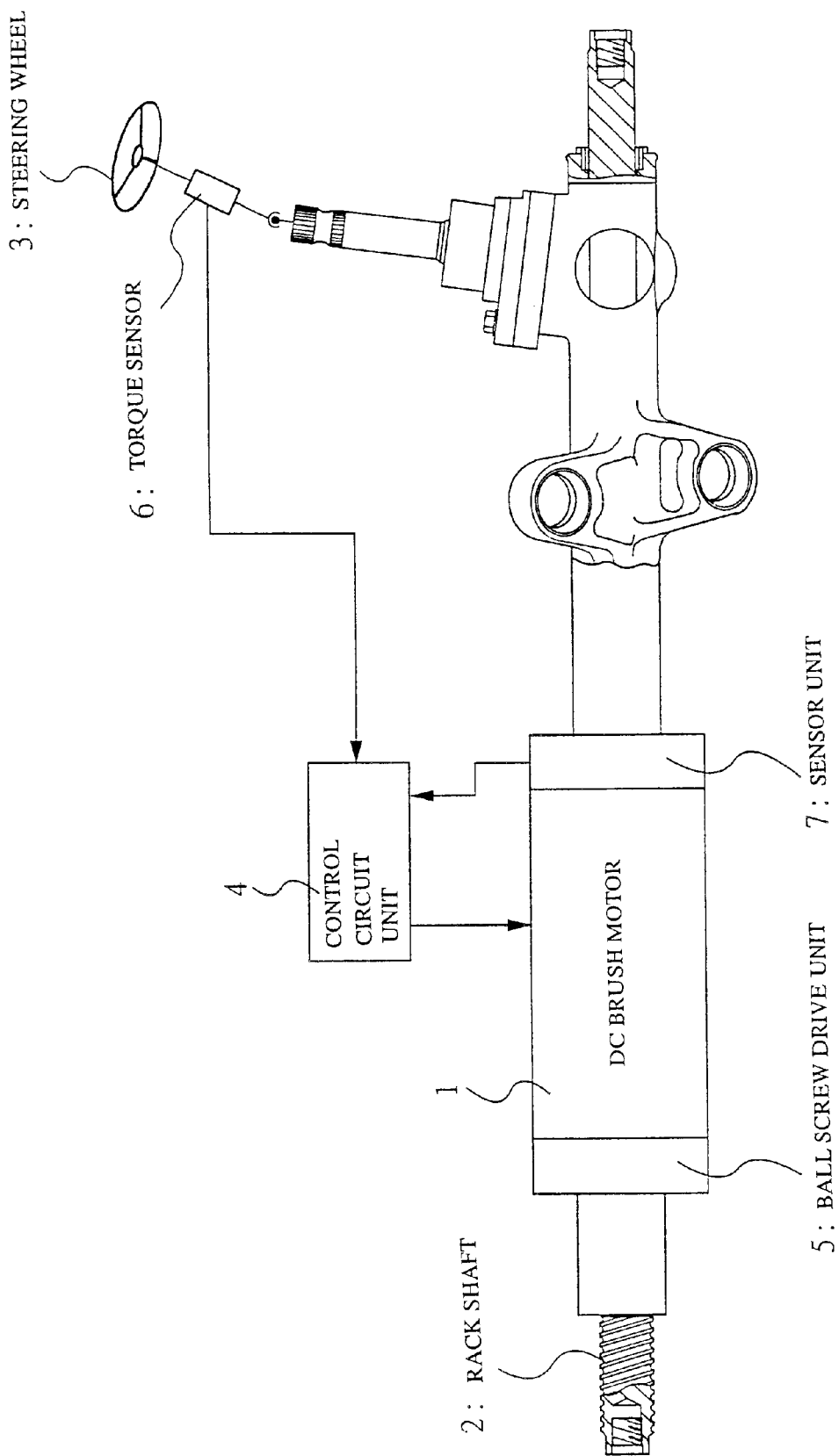
FIG. 1 is a schematic structural diagram showing essential parts of a motor-driven power steering device in an embodiment of the invention.
Figure 3:
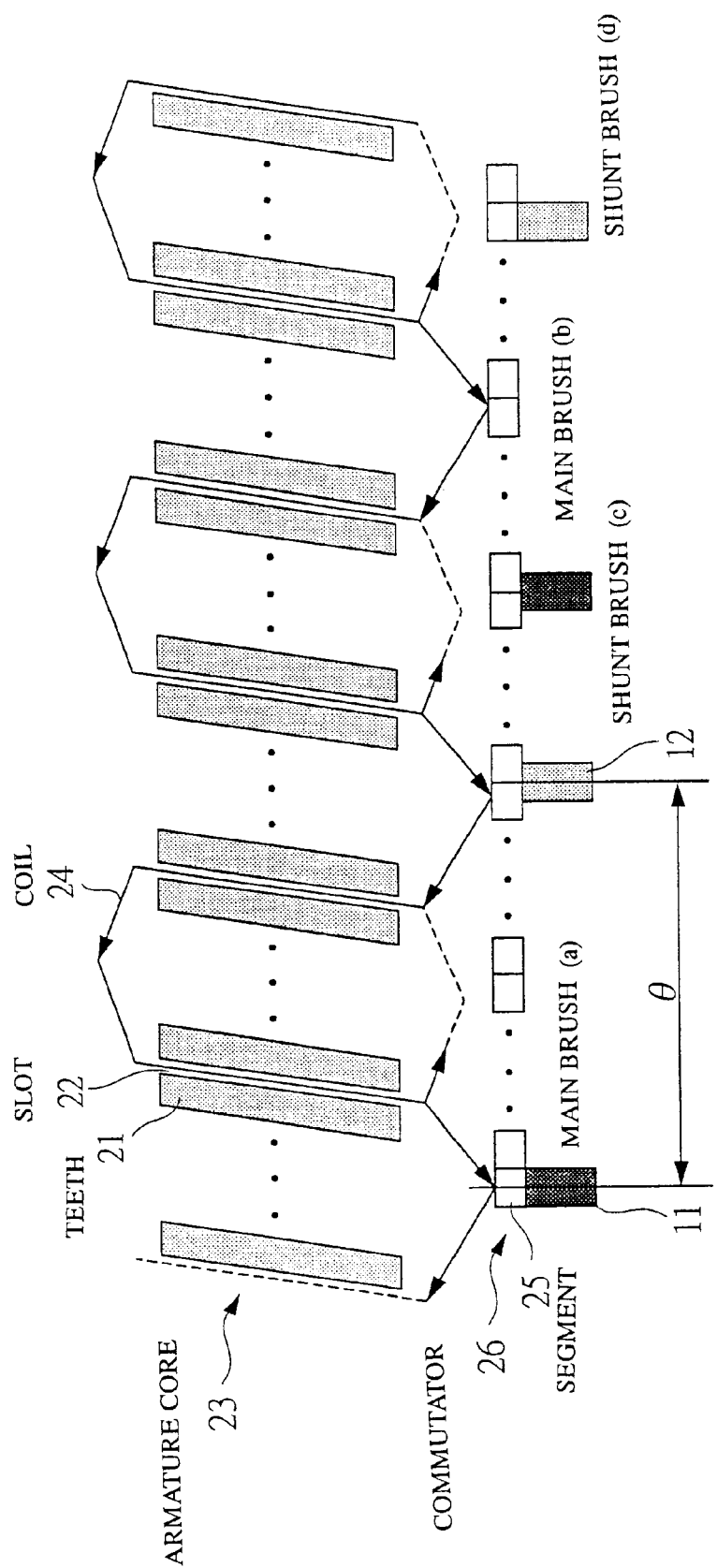
FIG. 3 is a schematic development diagram showing a brush structure in the motor-driven power steering device in the embodiment of the invention.
Figure 4:
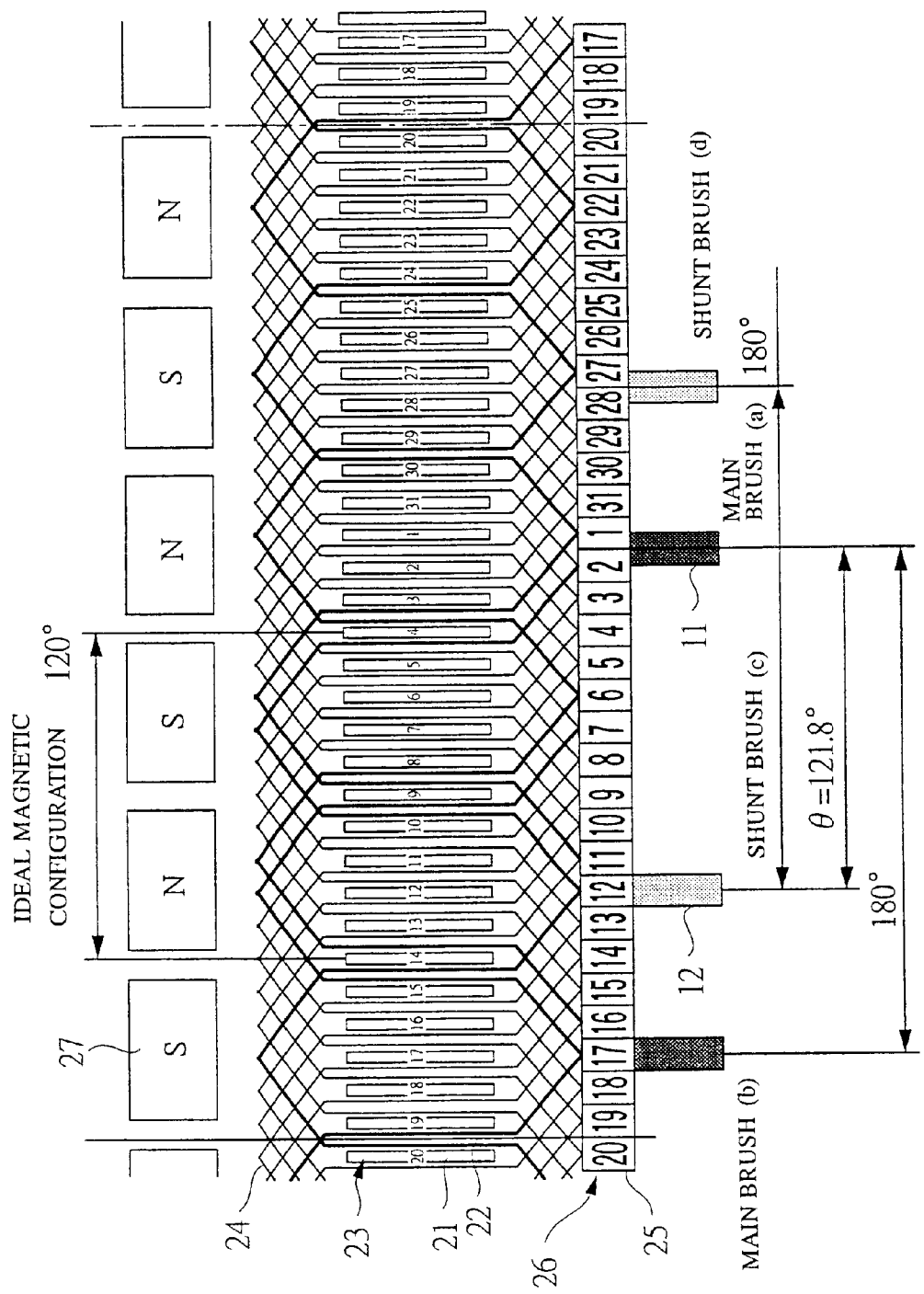
FIG. 4 is a schematic development diagram showing the detail of the brush structure in the motor-driven power steering device in the embodiment of the invention.
Figure 5:
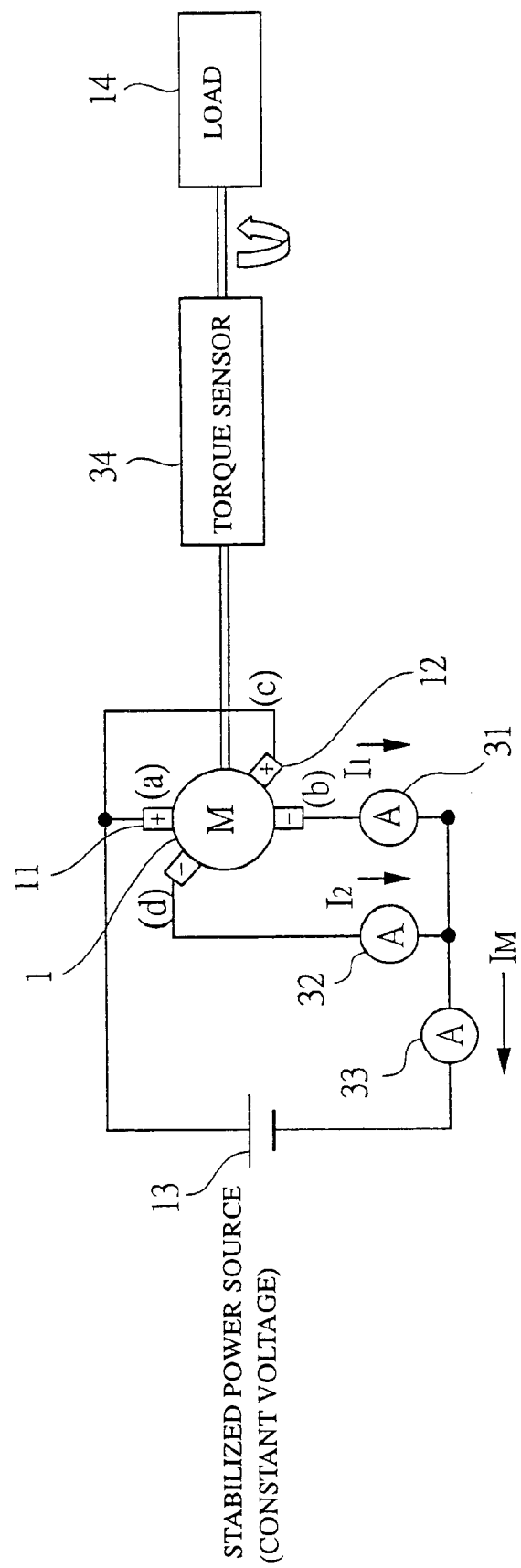
FIG. 5 is a schematic structural diagram showing a connection structure for measurement of current ripple and torque ripple characteristics in the motor-driven power steering device in the embodiment of the invention.

An embodiment of the invention is described below while referring to the accompanying drawings. FIG. 1 is a schematic structural diagram showing essential parts of a motor-driven power steering device in an embodiment of the invention, FIG. 2 is a schematic structural diagram showing a motor coupling structure in the motor-driven power steering device in the embodiment, FIG. 3 is a schematic development diagram showing a brush structure, FIG. 4 is a schematic development diagram showing the detail of the brush structure, FIG. 5 is a schematic structural diagram showing a connection structure for measurement of current ripple and torque ripple characteristics, FIG. 6 is a waveform diagram showing current ripple and torque ripple, and FIG. 7 is a characteristic diagram showing time-course changes of current ripple.

Referring first to FIG. 1, a schematic structure of an example of motor-driven power steering device in the embodiment is explained. The motor-driven power steering device of the embodiment is used, for example, as a steering device for turning wheels such as front wheels of an automobile, and comprises a DC brush motor 1, a rack shaft 2 provided coaxially in the DC brush motor 1, turning wheels (not shown) coupled to both ends of this rack shaft 2 through a coupling mechanism such as rod and arm, a steering wheel 3 coupled to the rack shaft 2 through a coupling mechanism such as steering shaft, a control circuit unit 4 for controlling driving of the DC brush motor 1, and a ball screw drive unit 5 for transmitting the steering assisting force generated by the DC brush motor 1 to the rack shaft 2, and the turning wheels are steered by the steering assisting force due to the DC brush motor 1 and by the manual steering force due to manipulation of the steering wheel 3.

The DC brush motor 1 of this motor-driven power steering device is controlled by the control circuit unit 4 on the basis of the detection result of a torque sensor 6 provided between the steering wheel 3 and rack shaft 2. In this DC brush motor 1, although not shown, a permanent magnet is disposed on the outer circumference portion (yoke), an armature core having plural slots is rotatably disposed on the inner circumference portion, plural coils are wound around the slots, and a commutator having plural segments is connected to each coil. By feeding of power from the brush electrically contacting with each segment of the commutator for feeding power to each coil from each segment, the armature core is put in rotation, and power is transmitted to the rack shaft 2 by way of the ball screw mechanism 5.

Figure 2:
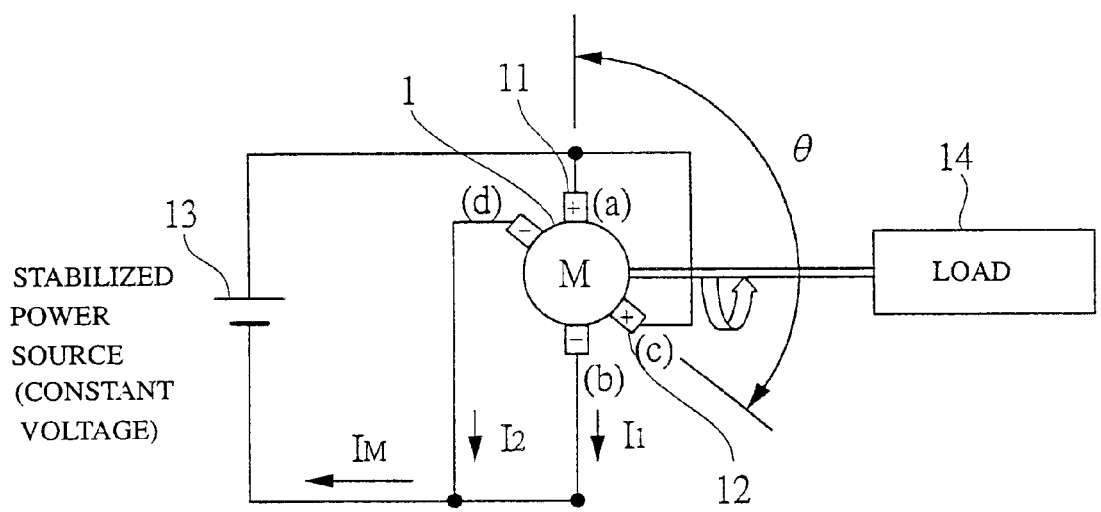
FIG. 2 is a schematic structural diagram showing a motor coupling structure in the motor-driven power steering device in the embodiment of the invention.

In particular, the DC brush motor 1 is designed, for example, as shown in FIG. 2, in which a pair of shunt brushes 12(*c*), 12(*d*) for shunting are added to a pair of main brushes 11(*a*), 11(*b*), and the shunt brushes 12(*c*), 12(*d*) are disposed at positions for geometrically inverting the brush contact positions to the segments. One main brush 11(*a*) of the pair of main brushes 11 is connected to the plus side of a stabilized power source 13, and the other main brush 11(*b*) is connected to the minus side, and current $I_1$ flows. One shunt brush 12(*c*) of the pair of shunt brushes 12 is connected to the plus side of the stabilized power source 13, and other shunt brush 12(*d*) is connected to the minus side, and current $I_2$ flows. In the DC brush motor 1, therefore, a combined current $I_m=I_1+I_2$ flows. By this DC brush motor 1, a load 14 is driven.

Moreover, as shown in FIG. 3, for example, the DC brush motor 1 comprises an armature core 23 having slots 22 among teeth 21, coils 24 wound around the slots 22, a commutator 26 having a segment 25 to which each coil 24 is connected, the pair of main brushes 11(*a*), 11(*b*) contacting electrically with each segment 25 of the commutator 26 for feeding power to each coil 24 from each segment 25, and the pair of shunt brushes 12(*c*), 12(*d*) contacting electrically with each segment 25 of the commutator 26 for feeding power to each coil 24 from each segment 25.

Specifically, an example of six (6) poles and thirty-one (31) slots is shown in FIG. 4. As shown in FIG. 4, in six poles of six magnets 27 of N poles and S poles disposed alternately, the slots 22 of the armature core 23 are divided into 31 slots (360°0/31=11.6°), and in this example, the main brushes 11(*a*), 11(*b*) are disposed at phase angle 180°, and the shunt brushes 12(*c*), 12(*d*) are similarly disposed at phase angle 180°. Corresponding to the main brushes 11(*a*), 11(*b*), the shunt brushes 12(*c*), 12(*d*) are disposed at phase angle θ=121.8° (120+0.9 +0.9) for inverting the segment contact position. This angle of disposition causes a difference from the angle of disposition 120° of the magnetic ideal disposition, but only by shifting the main brush 11 (*a*) and shunt brush 12 (*c*) symmetrically by a phase angle of 0.9°, there is no effect on the characteristic difference in the rotating direction, and the effect on rectification is as small as to be ignored, and hence it is established. Similarly, the main brush 11(*b*) and shunt brush 12(*d*) are shifted symmetrically by a phase angle of 0.9°.

In the brush structure of such DC brush motor 1, as shown in FIG. 4, for example, when the main brush 11(*a*) is positioned to contact with both segment 25(1) and segment 25(2) of the communicator 26, the main brush 11(*b*) contacts with segment 25(17), while the shunt brush 12(*c*) contacts with segment 25(12), and the shunt brush 12(*d*) is positioned to contact with both segment 25(27) and segment 25(28).

The winding manner of the coil 24 of the DC brush motor 1 is as shown in FIG. 4. For example, in the segments 25(1), 25(2) of the commutator 26 contacting with the main brush 11(*a*), the coil 24 starting winding from the segment 25(1) starts winding from the segment 25(1), and winds repeated by a specified number of turns in the slot 22 between teeth 21(3) and teeth 21(4) of the armature core 23, and in the slot 22 between teeth 21(8) and teeth 21(9), and finishes winding at segment 25(11), and the coil 24 starting winding from the segment 25(2) winds by a specified number of turns in the slots between the teeth 21(4), 21(5), and teeth 21(9), 21(10), and finishes winding at segment 25(12).

Similarly, in the segments 25(3) to 25(11) of the commutator 26, same as above, winding is started from each of the segments 25(3) to 25(11), and repeated by a specified number of turns in each slot 22 in the teeth 21(5) to 21(13), 21(6) to 21(14), and the teeth 21(10) to 21(18), 21(11) to 21(19), and finished in the segments 25(13) to 25(21) respectively.

Also, in the segment 25(12) of the commutator 26 contacting with the shunt brush 12(*c*), similarly, winding is started from the segment 25(12), and repeated by a specified number of turns in each slot 22 in the teeth 21(14), 21(15), and the teeth 21(19), 21(20), and finished in the segment 25(22).

Similarly, in the segments 25(13) to 25(16) of the commutator 26, same as above, winding is started from each of the segments 25(13) to 25(16), and repeated by a specified number of turns in each slot 22 in the teeth 21(15) to 21(18), 21(16) to 21(19), and the teeth 21(20) to 21(23), 21(21) to 21(24), and finished in the segments 25(23) to 25(26) respectively.

Also, in the segment 25(17) of the commutator 26 contacting with the main brush 11(*b*), similarly, winding is started from the segment 25(17), and repeated by a specified number of turns in each slot 22 in the teeth 21(19), 21(20), and the teeth 21(24), 21(25), and finished in the segment 25(27).

Similarly, in the segments 25(18) to 25(26) of the commutator 26, same as above, winding is started from each of the segments 25(18) to 25(26), and repeated by a specified number of turns in each slot 22 in the teeth 21(20) to 21(28), 21(21) to 21(29), and the teeth 21(25) to 21(2), 21(26) to 21(3), and finished in the segments 25(28) to 25(5) respectively.

Also, in the segments 25(27), 25(28) of the commutator 26 contacting with the shunt brush 12(*d*), similarly, winding is started from the segments 25(27), 25(28), and repeated by a specified number of turns in each slot 22 in the teeth 21(29) to 21(3), 21(30) to 21(31), and the teeth 21(3) to 21(4), 21(4) to 21(5), and finished in the segments 25(6), 25(7).

Similarly, in the segments 25(29) to 25(31) of the commutator 26, same as above, winding is started from each of the segments 25(29) to 25(31), and repeated by a specified number of turns in each slot 22 in the teeth 21(31) to 21(2), 21(1) to 21(3), and the teeth 21(5) to 21(7), 21(6) to 21(8), and finished in the segments 25(8) to 25(10) respectively.

The action of the embodiment is explained in FIG. 5 to FIG. 7, relating to an example of characteristics when the DC brush motor 1 is driven. FIG. 6 is a waveform diagram showing current ripple and torque ripple, and FIG. 7 is a characteristic diagram showing time-course changes of current ripple, each shown in comparison with a conventional DC brush motor.

As shown in FIG. 5, in order to observe current ripple, ammeters 31, 32 are connected to the main brush 11 and shunt brush 12, and an ammeter 33 is connected to the junction of combining them, and current $I_1$ flowing in the main brush 11, current $I_2$ flowing in the shunt brush 12, and combined current Im are measured. The conventional DC brush motor comprises only the main brush 11, and current $I_M$ flowing it is measured. To observe torque ripple, a torque sensor 34 is installed between the DC brush motor 1 and load 14, and torque is measured.

As a result of measurement, as shown in FIG. 6, as for the current ripple (P-P), in the conventional DC brush motor, the peak and bottom appear periodically in the waveform of current $I_M$ in each segment and the current ripple increases. However, in the DC brush motor 1 of the embodiment, the waveform of current $I_m$ is nearly flat, and the current ripple can be decreased. This is because the peak and bottom appear periodically in every segment in the waveforms of current $I_1$ flowing in the main brush 11 and current $I_2$ flowing in the shunt brush 12, but by varying the angle of disposition of the shunt brush 12 relating to the main brush 11 as mentioned above, the phases of peak and bottom of waveforms of both currents are different, and the phases of the shunted current waveforms are inverted to cancel each other.

Concerning the torque ripple (P-P), in the conventional DC brush motor, the peak and bottom appear periodically in the waveform of the torque in each segment in synchronism with the period of the current, and the torque ripple increases. However, in the DC brush motor 1 of the embodiment, same as the current Im, the waveform of torque is nearly flat, and the torque ripple can be decreased. This is because, same as in the case of current ripple, the angle of disposition of the shunt brush 12 is considered properly relating to the main brush 11.

The time-course changes of the current ripple are as shown in FIG. 7. FIG. 7 shows the current ripple (P-P) [A] in relation of the span of life [%], in which, in the conventional DC brush motor, the current ripple is large, and the change is large in relation to the span of life, but the DC brush motor 1 of the embodiment, the current ripple is small, and the change is small in relation to the span of life. This is because, in the DC brush motor 1 of the embodiment, as the segments 25, main brush 11 and shunt brush 12 are worn and changed in the time course, the current $I_1$, $I_2$ deteriorate similarly, and cancel each other to be stable.

Therefore, according to the motor-driven power steering device of the embodiment, by adding the shunt brush 12 for shunting the main brush 11, and disposing the shunt brush 12 at a position for geometrically inverting the brush contacting position with the segment 25, the individual phases of the shunted current waveforms are inverted to cancel each other, and the current ripple and torque ripple can be reduced substantially. It is particularly preferably in the motor-driven power steering device, as in the embodiment, in which the small current amplitude appears as the torque amplitude and a motor of high response is used.

Concerning time-course changes, too, waveforms of currents $I_1$, $I_2$ deteriorate similarly to cancel each other, so that a very stable characteristic is obtained. As for time-course changes which were conventionally very hard to reduce, it is effective to reduce current ripple and torque ripple in the embodiment.

Conventionally, disposing two pairs of brushes (a), (b), (c), (d), same motor characteristics were obtained by simultaneous power feeding to brushes (a)-(b) or brushes (c)-(d), or brushes (a)-(b), (c)-(d), and it is the known art in the 4WS or the like, but as in the embodiment, by further adjusting finely the angle of disposition of the main brush 11 and shunt brush 12, it can be employed as the technology for decreasing the current ripple and torque ripple, and the motor circuit is composed in a redundant structure of two circuits, and the reliability is enhanced.

The invention is not limited to the foregoing embodiment alone, but may be changed and modified within the scope of the spirit thereof. For example, not limited to the illustrated example of six poles and thirty-one slots, the number of poles and the number of slots may be varied. The number of brushes is not limited, and more brushes may be added to form three pairs or more. In such a case, too, each brush should be disposed at proper phase angle so that each phase of current waveform may be inverted to cancel each other.

Moreover, the motor brush structure of the invention is not limited to the motor-driven power steering device, but may be preferably applied widely in the wiper, power window, automatic slide door, and other devices, and especially in the device requiring a high response.

As explained herein, according to the motor brush structure of the invention, comprising a pair of first brushes and a pair of second brushes disposed at a phase angle for inverting the brush contact position to each segment, the phases of current waveforms of the first brush and second brush are inverted to cancel each other, so that the current ripple and torque ripple can be decreased substantially.

Further, as the segments and brushes are worn and changed in the time course, current waveforms of the first brush and second brush deteriorate similarly to cancel each other, so that a brush motor having a very stable characteristic may be realized.

According to the motor-driven power steering device of the invention, by using the motor as a DC brush motor for generating a steering assisting force, the current ripple generated at the time of commutation, and the resulting torque fluctuations can be reduced, so that generation of working sound, magnetostriction sound, radio noise, and cogging feel during steering operation can be suppressed.

What is claimed is:

1. A motor brush structure comprising an armature core having a plurality of slots; a plurality of coils wound around each one of said plurality of slots; a commutator having a plurality of segments connected to each one of said plurality of coils; a pair of first brushes electrically contacting with each segment of said commutator for feeding power to each coil from each segment; and a pair of second brushes disposed at a phase angle for inverting the brush contacting position to each segment corresponding to the first brushes, and electrically contacting with each segment of said commutator for feeding power to each coil from each segment; each phase of current waveforms of said first brushes and second brushes being inverted to cancel each other.

2. A motor-driven power steering device using a motor having the brush structure of claim 1, wherein said motor is used as a DC brush motor for generating a steering assisting force, and turning wheels are steered by the steering assisting force due to said DC brush motor and by a manual steering force due to manipulating a steering wheel.

* * * * *